(12) United States Patent
Abuhasira et al.

(10) Patent No.: US 10,775,786 B2
(45) Date of Patent: Sep. 15, 2020

(54) METHOD AND SYSTEM FOR EMULATING MODULAR AGNOSTIC CONTROL OF COMMERCIAL UNMANNED AERIAL VEHICLES (UAVS)

(71) Applicant: Percepto Robotics Ltd, Modiln (IL)

(72) Inventors: Dor Abuhasira, Doar-Na Lachish Darom (IL); Sagi Blonder, Ness Ziona (IL); Raviv Raz, Doar-Na Lachish Darom (IL)

(73) Assignee: Percepto Robotics Ltd, Modiln (IL)

( * ) Notice: Subject to any disclaimer, the term of this patent is extended or adjusted under 35 U.S.C. 154(b) by 187 days.

(21) Appl. No.: 16/032,119

(22) Filed: Jul. 11, 2018

(65) Prior Publication Data

US 2018/0329417 A1    Nov. 15, 2018

Related U.S. Application Data

(63) Continuation-in-part of application No. PCT/IL2017/050056, filed on Jan. 17, 2017.
(Continued)

(51) Int. Cl.
*G05D 1/00* (2006.01)
*G05D 1/08* (2006.01)
(Continued)

(52) U.S. Cl.
CPC ......... *G05D 1/0077* (2013.01); *B64C 39/024* (2013.01); *G05D 1/0022* (2013.01);
(Continued)

(58) Field of Classification Search
CPC .. G05D 1/0077; G05D 1/0022; G05D 1/0088; G05D 1/0094; B64C 39/024
(Continued)

(56) References Cited

U.S. PATENT DOCUMENTS 8,924,044 B1 * 12/2014 Wang ................... H04J 11/0023
                                                    701/2
9,273,981 B1 *  3/2016 Downey ............... B64C 39/024
(Continued)

FOREIGN PATENT DOCUMENTS

WO    WO 2017/125916    7/2017

OTHER PUBLICATIONS

International Preliminary Report on Patentability dated Aug. 2, 2018 From the International Bureau of WIPO Re. Application No. PCT/IL2017/050056. (6 Pages).
(Continued)

*Primary Examiner* — Yazan A Soofi

(57) ABSTRACT

A method for emulating control signals for controlling an unmanned aerial vehicle (UAV). The method comprises using an integrated circuit installed on the UAV and communicatively coupled to a flight control processor and a companion processor for receiving flight control parameters from the companion processor, the flight control parameters are based data from a plurality of sensors communicatively coupled to the companion processor and mounted on the UAV, wirelessly receiving remote control signals from a remote control unit, modulating the flight control parameters to create emulated signals emulating a signals generated by a remote control designated to wirelessly control the UAV, the emulated signals encode instructions to maneuver the UAV, and switching between the remote control signals and the emulated signals during a flight time of the UAV.

16 Claims, 2 Drawing Sheets

Related U.S. Application Data

Figure 1:
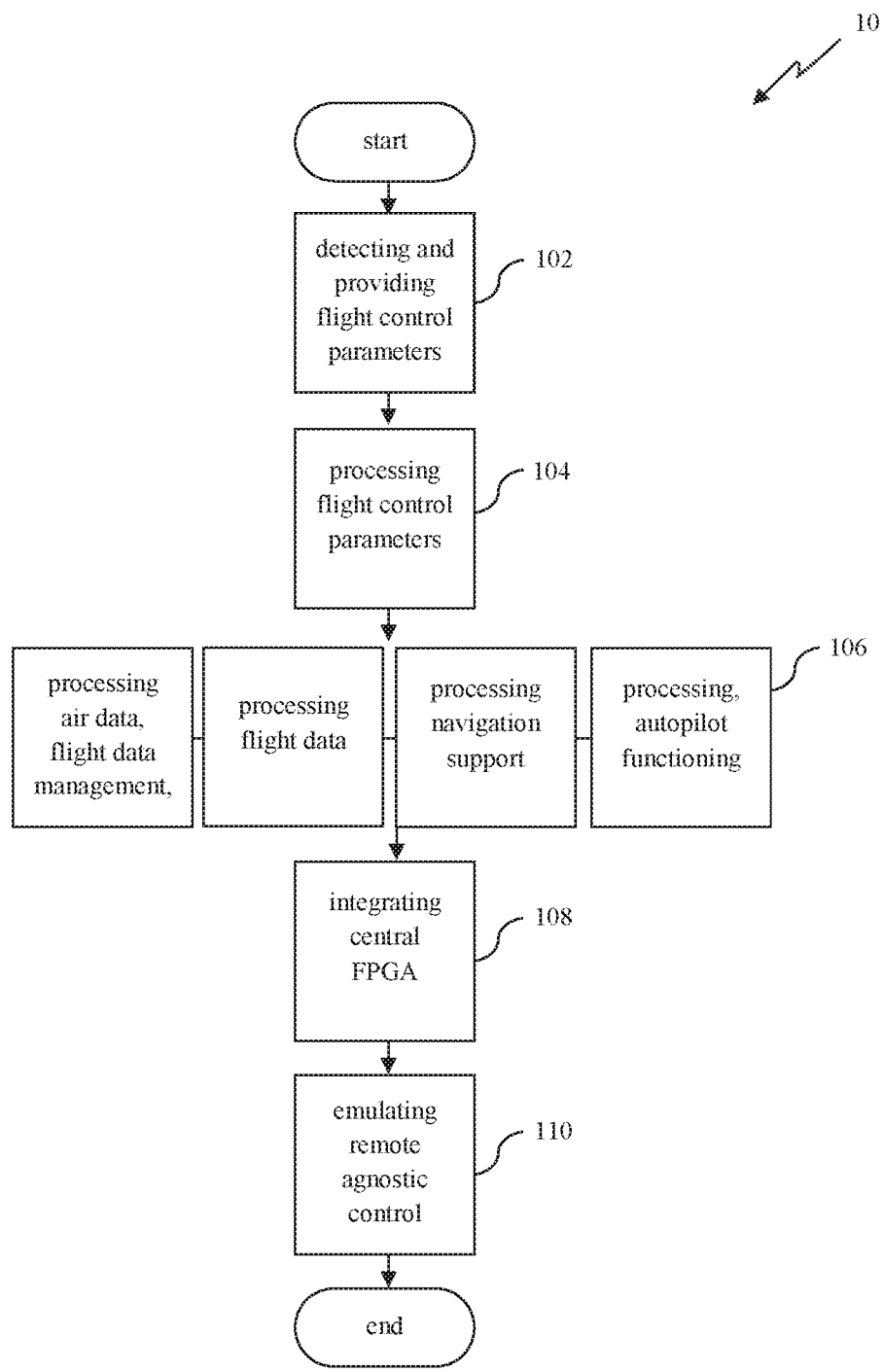

(60) Provisional application No. 62/280,131, filed on Jan. 19, 2016.

(51) Int. Cl.
    *B64C 39/02*      (2006.01)
    *H04L 25/49*      (2006.01)

(52) U.S. Cl.
    CPC ......... *G05D 1/0088* (2013.01); *G05D 1/0094* (2013.01); *G05D 1/0808* (2013.01); *B64C 2201/127* (2013.01); *B64C 2201/146* (2013.01); *H04L 25/4902* (2013.01)

(58) Field of Classification Search
    USPC .......................................................... 701/2
    See application file for complete search history.

(56) References Cited

U.S. PATENT DOCUMENTS

| | | | |
|---|---|---|---|
| 10,168,695 B2* | 1/2019 | Barnickel | H04B 7/18506 |
| 10,340,983 B2* | 7/2019 | Liu | H04B 3/58 |
| 2008/0052418 A1* | 2/2008 | Marchetti | G05B 19/4148 |
| | | | 710/7 |
| 2010/0329247 A1* | 12/2010 | Kennedy | H04B 1/7163 |
| | | | 370/389 |
| 2016/0047895 A1* | 2/2016 | Dussan | G01S 7/4814 |
| | | | 356/4.01 |
| 2016/0091894 A1* | 3/2016 | Zhang | B64C 39/024 |
| | | | 701/2 |
| 2017/0039764 A1* | 2/2017 | Hu | G08G 5/0013 |
| 2017/0293036 A1* | 10/2017 | Farsoni | G01T 1/2018 |
| 2018/0081351 A1* | 3/2018 | Tankersley | B64C 39/024 |
| 2019/0063881 A1* | 2/2019 | Abramov | G05D 1/0016 |

OTHER PUBLICATIONS

International Search Report and the Written Opinion dated Apr. 25, 2017 From the International Searching Authority Re. Application No. PCT/IL2017/050056. (8 Pages).

Kannan et al. "Simulation and Development Environment for Multiple Heterogeneous UAVs", AIAA Modeling and Simulation Technologies Conference and Exhibit, Providence, Rhode Island, USA, Aug. 16-19, 2004, AIAA 2004-5041, p. 1-10, Aug. 16, 2004.

\* cited by examiner

METHOD AND SYSTEM FOR EMULATING MODULAR AGNOSTIC CONTROL OF COMMERCIAL UNMANNED AERIAL VEHICLES (UAVS)

RELATED APPLICATIONS

This application is a Continuation-in-Part (CIP) of PCT Patent Application No. PCT/IL2017/050056 filed on Jan. 17, 2017, which claims the benefit of priority under 35 USC 119(e) of U.S. Provisional Patent Application No. 62/280,131 filed on Jan. 19, 2016, the contents of which are incorporated herein by reference in their entirety.

FIELD AND BACKGROUND OF THE INVENTION

The present invention generally relates to emulation of agnostic control of position, course or altitude of land, water, air, or space vehicles, and particularly to the remotely controlled unmanned aerial vehicles and their coordination via a central field-programmable gate array (FPGA).

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

An unmanned aerial vehicle (UAV), commonly known as a drone and referred to as a Remotely Piloted Aircraft (RPA) by the International Civil Aviation Organization (ICAO), is an aircraft without a human pilot aboard. Its flight is controlled either autonomously by onboard computers or by the remote control of a pilot on the ground or in another vehicle. The typical launch and recovery method of an unmanned aircraft is by the function of an automatic system or an external operator on the ground. Historically, UAVs were simple remotely piloted aircraft, but autonomous control is increasingly being employed. A UAV is capable of controlled, sustained level flight and is powered by a jet, reciprocating, or electric engine.

After many years of growth and innovation mainly in military segment, the global UAV industry is now going through a challenging period, with possible increasing of market dynamics towards wider use of UAVs for commercial and civil purposes. Tens of thousands of users have flown radio-controlled aircrafts for many years, in the past. But drones of commercial value are the result of recent advances in microprocessors, GPS, sensors, batteries, motors, lightweight structural materials, and advanced manufacturing techniques.

Different technological applications to control UAVs in different environments are known in the art. U.S. Pat. No. 7,725,257, Method and system for navigation of an unmanned aerial vehicle in an urban environment, by Honeywell International Inc., discloses a method and system for navigation of an unmanned aerial vehicle (UAV) in an urban environment. The method comprises capturing a first set of Global Positioning System (GPS)-tagged images in an initial fly-over of the urban environment at a first altitude, with each of the GPS-tagged images being related to respective GPS-aided positions.

The captured GPS-tagged images are stitched together into an image mosaic using the GPS-aided positions. A second set of images is captured in a subsequent fly-over of the urban environment at a second altitude that is lower than the first altitude. Image features from the second set of images are matched with image features from the image mosaic during the subsequent fly-over. A current position of the UAV relative to the GPS-aided positions is calculated based on the matched image features from the second set of images and the image mosaic. U.S. Pat. No. 8,378,881, Systems and methods for collision avoidance in unmanned aerial vehicles, by Raytheon Company, discloses systems and methods for collision avoidance in unmanned aerial vehicles. In one embodiment, the invention relates to a method for collision avoidance system for an unmanned aerial vehicle (UAV), the method including scanning for objects within a preselected range of the UAV using a plurality of phased array radar sensors, receiving scan information from each of the plurality of phased array radar sensors, wherein the scan information includes information indicative of objects detected within the preselected range of the UAV, determining maneuver information including whether to change a flight path of the UAV based on the scan information, and sending the maneuver information to a flight control circuitry of the UAV.

Modular distributed control in the area of unmanned aerial vehicles is known. Article "A Modular Software Infrastructure for Distributed Control of UAVs", by Allison Ryan, et al. presents a software architecture and UAV hardware platform that have demonstrated single-user control of a fleet of aircraft, distributed task assignment, and vision-based navigation. A modular software infrastructure has been developed to coordinate distributed control, communications, and vision-based control. Along with the onboard control architecture, a set of user interfaces has been developed to allow a single user to efficiently control the fleet of aircraft. Distributed and vision-based control is enabled by powerful onboard computing capability and an aircraft-to-aircraft ad-hoc wireless network. U.S. Pat. No. 8,989,922, Modular drone and methods for use, by Azure Sky Group, LLC., discloses a navigation unit configured to determine the location of the drone and navigate the drone to designated locations; a radio frequency identification (RFID) reader configured to read RFID tag information from RFID tags; and a wireless network transceiver configured to periodically transmit the location of the drone and RFID tag information to an inventory management system. Various exemplary embodiments relate to a method performed by a drone. The method may include: receiving navigation path information; navigating the drone along the navigation path based on satellite location signals; determining current position information based on the satellite location signals; reading RFID tag information from a first RFID tag; and transmitting the RFID tag information and the current position information via a wireless client to a central computing system.

Commercially utilized unmanned aerial vehicles (UAVs) can efficiently perform surveillance, mapping, monitoring, tracking, videography, logistics operations and other tasks without extended effort or human risk. However, a large number of currently deployed commercial unmanned aerial vehicles demonstrate a fragmentation of different software and hardware platforms and need for increased agnostic autonomy and cooperation.

None of the current technologies and prior art, taken alone or in combination, does not address nor provide a truly integrated solution for developing capabilities for emulating an agnostic control of position, course or altitude of the remotely controlled unmanned aerial vehicles via a central field-programmable gate array (FPGA), that can be installed and configured on any of commercial drones, unifying the vast network of currently deployed commercial unmanned aerial vehicles.

Therefore, there is a long felt and unmet need for a system and method that overcomes the problems associated with the prior art.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

It is thus an object of some embodiments of the present invention to provide a system for emulating agnostic control of one or more unmanned aerial vehicles (UAVs), the system comprising: a plurality of sensors configured to detect and provide flight control parameters within a predetermined area of the vehicle's operation; a companion flight control processor communicatively coupled to the plurality of sensors configured to process the flight control parameters; a remote control unit; a central field-programmable gate array (FPGA), FPGA is communicatively coupled to a primary flight control processor, the companion control processor and the remote control unit; a primary flight control processor configured to process flight management data, navigation support data, and autopilot functioning data; the FPGA is integrated in any type of the one or more UAVs emulating remote controlling agnostic means in real-time between the primary flight control processor and the companion flight control processor.

It is another object of the present invention to provide a method for emulating modular agnostic control of commercial unmanned aerial vehicles comprising the steps of: detecting and providing flight control parameters within a predetermined area of the vehicle's operation by a plurality of sensors; processing the flight control parameters by a companion flight control processor; processing air data, flight data management, navigation support, and autopilot functioning by an primary flight control processor; integrating central field-programmable gate array (FPGA) in any type of the one or more UAVs emulating remote controlling agnostic means in real-time between the primary flight control processor and the companion flight control processor.

BRIEF DESCRIPTION OF THE SEVERAL VIEWS OF THE DRAWING(S)

Figure 2:
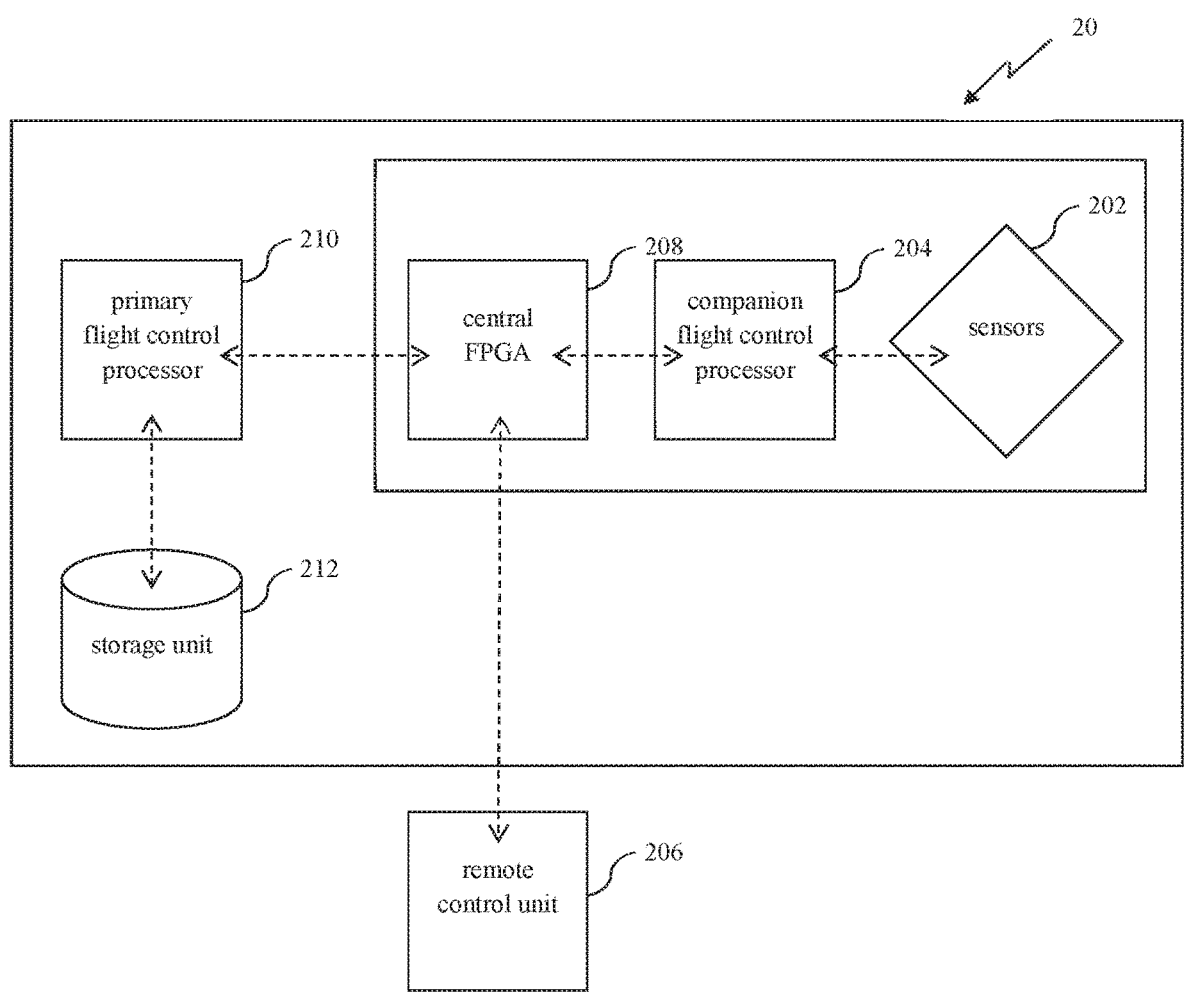

The novel features believed to be characteristics of the invention are set forth in the appended claims. The invention itself, however, as well as the preferred mode of use, further objects and advantages thereof, will best be understood by reference to the following detailed description of illustrative embodiment when read in conjunction with the accompanying drawings, wherein:

FIG. 1 presents a top level scheme of the method disclosed by the present invention; and FIG. 2 presents an embodiment of the system disclosed by the present invention.

DESCRIPTION OF SPECIFIC EMBODIMENTS OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "transmitting", "detecting," "calculating", "processing", "performing," "identifying," "configuring" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices, including integrated circuits down to and including chip level firmware, assembler, and hardware based micro code.

While the invention is susceptible to various modifications and alternative forms, specific embodiments thereof have been shown by way of example in the drawings and the above detailed description. It should be understood, however, that it is not intended to limit the invention to the particular forms disclosed, but on the contrary, the intention is to cover all modifications, equivalents, and alternatives falling within the spirit and scope of the invention as defined by the appended claims.

The term "remote controlling agnostic means" interchangeably refers, but not limited to control of an activity and/or process of one or more UAVs from a distance, as by radioed instructions or coded signals, such control interoperable among various systems. The remote controlling agnostic means consist from a flight control data of the one or more UAVs; visual collision avoidance data acquired by data acquisition means for filtering, sampling, multiplexing, data distribution means and sensor means for short-term and/or long-term position determination; onboard vision processing data; precise surveying and mapping data; precise vertical take-off and landing (VTOL) data, balancing data, pattern recognition data to detect a known pattern identifying a landing site and any combinations thereof.

Reference is now made to FIG. 1, which is a flow chart of an exemplary method 10 for emulating modular agnostic control of commercial unmanned aerial vehicles used with the payment system disclosed in the present invention 20. The method comprises, for a number of repetitions, steps of: detecting and providing flight control parameters by a plurality of sensors 102; processing flight control parameters by a companion flight control processor 104; processing air data, flight data management, navigation support, and autopilot functioning by an primary flight control processor 106; integrating central field-programmable gate array (FPGA) 108; and emulating remote controlling agnostic means in real-time between the primary flight control processor and the companion flight control processor by the FPGA 110.

In the step 110, the step of emulating by the FPGA includes processing and transmitting flight control data to the one or more UAVs such that the UAV's actions are controlled; processing and transmitting visual collision avoidance data by data acquisition means for filtering, sampling, multiplexing, data distribution means and sensor means for short-term and/or long-term position determination; processing and transmitting piloting decisions based on onboard vision processing data; processing and transmitting precise surveying and mapping data; processing and transmitting precise vertical take-off and landing (VTOL) data, processing and transmitting balancing data; processing and transmitting pattern recognition data to detect a known pattern identifying a landing site; transmission to the companion flight control processor to comply in accordance with the received flight command data.

The method disclosed in the present invention can further comprise emulating by the companion flight control processor coupled to the FPGA installed on two or more unmanned aerial vehicles (UAVs) flight command data to establish autonomous operable network of unmanned aerial vehicles (UAVs), sharing flight command data in real-time; and to establish autonomous operable network of unmanned aerial vehicles (UAVs), sharing remote controlling agnostic means in real-time.

Reference is now made to FIG. 2, which is a schematic illustration of an example of the system 20 for emulating agnostic control of one or more unmanned aerial vehicles (UAVs) disclosed by some embodiments of the present invention. The system 20 comprising: a plurality of sensors 202 configured to detect and provide flight control parameters within a predetermined area of the vehicle's operation; a companion flight control processor 204 communicatively coupled to the plurality of sensors 202 configured to process the flight control parameters; a remote control unit 206; a remote control signal emulator 208 such as a central field-programmable gate array (FPGA) 208, the FPGA 208 is communicatively coupled to a primary flight control processor 210 the companion control processor 204 and the remote control unit 206 and integrated in any type of the one or more UAVs emulating remote controlling agnostic means in real-time between the primary flight control processor 210 and the companion flight control processor 204; a primary flight control processor 210 configured to process flight management data, navigation support data, and autopilot functioning data; and a storage unit 212 storing flight command data.

The remote control signal emulator 208 is optionally an integrated circuit comprising or connected to a controller or a microcontroller, a signal modulator receiving an input from the companion flight control processor 204, and a switch switching between signals, optionally wired, from the modulator and wireless signals received from the remote control unit 206. Optionally, the controller is a system on chip (SoC) executing local operating system and logic. Optionally, the controller is a dedicated controller, such as a PIC-microcontroller. Optionally, the remote control signal emulator 208 is an FPGA facilitating a stability of an application-specific hardware with versatility of changing logic without a manufacturing process. Optionally, the remote control signal emulator 208 is an application specific integrated circuit. In use, the modulator creates a multi control channel signal encoding N values, for instance 8, emulating the signals received from the remote control unit 206.

The modulator may be a computer bus system and/or designed to apply a Pulse-position modulation (PPM). Optionally, when the UAV is a multirotor vehicle, each of the values describes a desired change for a control channel such as throttle, pitch, roll, yaw, camera direction, and/or the like. The remote control signal emulator 208 may also emulate communication on a digital channel, such as MAV-Link for receiving telemetry data such as GPS status, battery, system health, camera data and/or the like and transmitting to the primary flight control processor instructions such as GPS navigation waypoints from a processor based ground control unit. The sensors 202 may include a Global Positioning System (GPS) module and/or an inertial measurement unit (IMU) such as a 9-Axis IMU (actually, 2 of both). The sensors 202 may include a camera, a thermal camera a range camera and/or, a laser range finder. The sensors 202 may include a network interface for receiving parameters from external sources such as weather station, for instance wind, temperature, humidity and rain data to algorithms. The sensors 202 may include gas sniffers, radiation detectors, thermographic cameras, sonar range finders, stereo camera(s), non-forward facing cameras and/or the like. The sensors 202 may include system health sensors such as self-temperature, humidity, and/or the like. In use, the companion flight control processor 204 may calculate instructions for forwarding to the remote control signal emulator 208 based on data from any combination of sensors.

FPGA is configured to emulate processing and transmitting flight control data to the one or more UAVs such that the UAV's actions are controlled; processing and transmitting visual collision avoidance data by data acquisition means for filtering, sampling, multiplexing, data distribution means and sensor means for short-term and/or long-term position determination; emulate processing and transmitting piloting decisions based on onboard vision processing data; processing and transmitting precise surveying and mapping data; processing and transmitting precise vertical take-off and landing (VTOL) data; processing and transmitting balancing data; processing and transmitting pattern recognition data to detect a known pattern identifying a landing site; data transmission to the companion flight control processor to comply in accordance with the received flight command data.

The companion flight control processor coupled to the FPGA installed on two or more unmanned aerial vehicles (UAVs) is configured to emulate flight command data to establish autonomous operable network of unmanned aerial vehicles (UAVs), sharing flight command data in real-time; and flight command data to establish autonomous operable network of unmanned aerial vehicles (UAVs), sharing remote controlling agnostic means in real-time.

Reference is now made to an exemplary description of the operation of a system for emulating agnostic control of a UAV according to some embodiments of the present invention, for instance system 20. In use, the companion flight control processor 204 executes a software code for running data analysis algorithms on the sensor data which is received from the sensors and control algorithms to calculate desired values for each of the control channels which are later modulated by the modulator of the remote control signal emulator 208, for instance any of the channels encoding one or more channels each encoding one or more of the following: a roll value, a pitch value, a throttle value, a yaw value, a camera-pitch value, a flight mode value, a mission-specific trigger value, and a safety override channel value. The resulting values are sent from the companion flight control processor 204 to the remote control signal emulator 208, for instance via a dedicated inter-integrated circuit (I2C) at a changing rate in arrange such as a between 10 hertz (Hz) and 50 Hz. The remote control signal emulator 208, for instance an FPGA, receives the I2C instructions, which contain 8 values, optionally between 1000 and 2000 to represent PPM microseconds. This allows the remote control signal emulator 208 to generate and output a PPM and/or a SBUS signal.

The remote control signal emulator 208 operates the switch based on a set of rules and/or a classifier for controlling which signals (either from the modulator or from the remote control unit 206) are provided to the primary flight control processor 210. In such a manner and as the modulator modulates the data from the remote control signal emulator 208 as if it is encoded by the remote control unit, the primary flight control processor 210 does not have to be adapted to programed to receive more than a single stream of instructions data and remains unaware of actual source of the instructions data. This allows the primary flight control processor 210 to use internal control loops such as PID to manipulate the vehicle's engines to accommodate desired channel values.

Optionally, the modulator is external to the remote control signal emulator 208 and therefore the remote control signal emulator 208 receives modulated signals (e.g. PPM or SBUS signals). Optionally, the remote control signal emulator 208 is adapted to disconnect the companion flight control processor 204 from the primary flight control processor 210 in a safety override mode from the flight controller. All received commands from the companion flight control processor 204 are ignored and the PPM signal from a remote control receiver is passed through to the primary flight control processor 210. Only when a "safety override switch" is disabled, for example in a normal system operation, channel muxing feature is available. In such embodiments, the remote control signal emulator 208 may analyze the received data to extract N channel values for safety override.

Optionally, the switch to the safety override mode is held when a channel value coming from an actual remote control is above a threshold. When the safety override mode is triggered the remote control signal emulator 208 stops emulating signals based on data from the companion control processor 204 and passes the actual remote signals form the remote control unit 206 through to the primary flight control processor 210, as-is. This disconnects the control of the companion flight control processor 204 on data received by the primary flight control processor 210. Additionally or alternatively, in such embodiments, the remote control signal emulator 208 may analyze the received data to extract N channel values for channel muxing. When one of the channel values in the I2C signal deviates from a specified value range, for instance not between 1000 and 2000, an actual remote value is used for a specific channel, creating emulated signals with channels controlled by the companion control processor 204, the other by the human pilot.

Additionally or alternatively, the remote control signal emulator 208 operates as an automated safety layer. In such embodiments, when an I2C signal is not detected for more than a period of time, for instance for more than a 0.5 second, a second, 5 seconds, or any intermediate or longer periods, the remote control signal emulator 208 emulates a pre-defined signal with pre-defined values. The pre-defined signal triggers flight modes that give control to logic executed by the primary flight control processor 210 itself. The logic may be a set of instructions for one or more of: landing in place (referred to as LAND), a pre-defined navigation to a safe landing zone for landing (referred to as AUTO), hovering in place until a manual takeover takes place (referred to as BRAKE), and hovering in place until I2C connection is reestablished (referred to as BRAKE).

Optionally, the remote control signal emulator 208 has a secondary channel input for receiving an override channel with specific assignments for an General-purpose input/output (GPIO) value, for instance digital GPIO pins (e.g. 2-bit). This allows multiple modes for the channel, for instance a normal operation mode, LAND mode, AUTO mode, and BRAKE mode. Upon triggering, the emulator cuts off software control and emulates a pre-defined signal, as described above. In such embodiment, the control of the flight is switched is receive from the integrated circuit additional emulated signals adapted to control the flight of the UAV for performing a predefined operation such as landing or hovering.

As indicated above the remote control signal emulator 208 operates the switch based on a set of rules and/or a classifier for controlling which signals (either from the modulator or from the remote control unit 206) are provided to the primary flight control processor 210. The set of rules may be for controlling landing of the UAV. For instance upon detection of landing, either based on predefined geographic coordinates, computer vision detection, and/or set of instructions from the remote control unit 206, the remote control signal emulator 208 may switch to allow emulated signals to control delicate maneuvers, fine adjustments to direction of the UAV while descending, for instance according to computer vision algorithm applied on data from a camera sensor, for instance based on a location of a reference label on a landing pad. In such embodiment the camera sensor may face downwards during landing. The emulated signals may be provided as intermediate signals to adjust movement instructed by the signals received from the remote control unit. This allows smoothing the effect of a strong maneuver action while taking into account parameters captured using the sensors of the UAV. The set of rules may be for adjusting maneuvering of the UAV. In such embodiments upon detection of entry to a certain area and/or certain signals or radiation during a control loop, remote control signal emulator 208 switches to allow emulated signals to achieve delicate and/or aggressive maneuvers in the same control loop, keep up with elusive targets such as people, animals and other UAVs, as well as very fast and bulky targets such as road/off-road ground vehicles. As used herein, delicate maneuvers are fine corrections to a position, for instance fine corrections during a landing on a pad. For example, fine corrections to may be at accuracy of about 1-3 centimeter or less (laterally). The corrections may be applied in order to center the UAV in the center of the pad. The fine corrections maybe forwarded via a digital command (e.g. Mavlink) indicating "move 1 cm to the left". Additionally or alternatively, the fine corrections maybe an emulated PPM signal to easily guide the UAV to the landing pad, using a control loop in the companion computer and computer vision as a feedback system.

The later solution is less bulky, providing a machine-like maneuver that may miss the target. As used herein, aggressive maneuvers are stip change of direction, such as tracking a person or an animal which changes direction of movement in an instant. When the is used to track an object moving at high speed, for example of about 40-50 kilometers per hour, a prompt change of flight direction in a very short time is preferred. This may be done using an emulated signal and/or a control loop with computer vision as a feedback. In this case, the control loop algorithm may instruct the remote control signal emulator 208 to change roll value from 1000 to 2000 (e.g. hard left to hard right) in an instant (down to 50 Hz=20 ms), creating the strongest change of direction the vehicle is capable of. The set of rules may be for controlling the positioning of the UAV. In such embodiments the emulated signals are used to make adjustments, optionally fine of few centimeters or less, to a position of the UAV in order to achieve a high-precision position hold. For example, to get an inspection data from the exact same spot over time. Optionally, local GPS module of the UAV is used to navigate the UAV to an approximate position and then computer vision algorithms executed on data from camera sensors is used to place the UAV in a desired position. The set of rules may be for controlling a sensor, such as a camera.

What is claimed is:

1. A method for emulating control signals for controlling an unmanned aerial vehicle (UAV), comprising:
   using an integrated circuit installed on the UAV and communicatively coupled to a flight control processor and a companion processor for:
   receiving flight control parameters from the companion processor, the flight control parameters based on data from a plurality of sensors communicatively coupled to the companion processor and mounted on the UAV;
   wirelessly receiving remote control signals from a remote control unit;
   modulating the flight control parameters to create emulated signals emulating signals generated by a remote control configured to wirelessly control the UAV, the emulated signals encoding instructions to maneuver the UAV; and switching between the remote control signals and the emulated signals during a flight time of the UAV,
wherein the switching is performed based on at least one of a set of rules and a classifier for controlling which of the remote control signals and the emulated signals are provided to the primary flight control processor.

2. The method of claim 1, wherein the emulated signals and the remote control signals are multi-channel signals comprising channels encoding at least some of the following: a roll value, a pitch value, a throttle value, a yaw value, a camera-pitch value, a flight mode value, a mission-specific trigger value, and safety override channel value.

3. The method of claim 1, further comprising processing outputs of at least one of the plurality of sensors; wherein the switching is performed according to an outcome of the processing.

4. The method of claim 1, wherein the emulated signals are modulated as SBUS signals.

5. The method of claim 1, wherein the emulated signals are modulated using pulse-position modulation (PPM).

6. The method of claim 1, wherein the emulated signals encode instructions for controlling UAV payloads.

7. The method of claim 1, wherein the flight control parameters are encoded as an Inter-Integrated Circuit ($I^2C$) signal.

8. The method of claim 1, wherein the integrated circuit is a central field-programmable gate array (FPGA).

9. The method of claim 1, wherein the emulated signals encode instructions for landing the UAV.

10. The method of claim 1, wherein the emulated signals encode instructions for navigating the UAV to a predefined location.

11. The method of claim 1, wherein the emulated signals encode instructions generated according to the remote control signals.

12. The method of claim 1, wherein the switching is performed when the remote control signals are not received for longer than a predefined period.

13. The method of claim 1, wherein the switching is performed when the remote control signals are indicative of a landing command.

14. The method of claim 1, further comprising receiving instructions via a secondary channel input; wherein the switching comprises receiving from the integrated circuit additional emulated signals adapted to control the flight of the UAV for performing a predefined operation.

15. An unmanned aerial vehicle (UAV), comprising:
a flight control processor;
a companion processor;
a receiver adapted to receive flight control parameters from the companion processor, the flight control parameters are based on data from a plurality of sensors communicatively coupled to the companion processor and mounted on the UAV; and
an integrated circuit communicatively coupled to the flight control processor, the receiver and the companion processor, the integrated circuit having:
a wireless receiver adapted to receive a remote control signal from a remote control unit;
a modulator adapted to modulate the flight control parameters to create an emulated signal emulating a signal generated by a remote control configured to wirelessly control the UAV, the emulated signal encodes instructions to maneuver the UAV; and
a switch adapted to switch between the remote control signal and the emulated signal during a flight time of the UAV;
wherein the switch is adapted to switch between the remote control signal and the emulated signal based on at least one of a set of rules and a classifier for controlling which of the remote control signals and the emulated signals are provided to the primary flight control processor.

16. An integrated circuit for an unmanned aerial vehicle (UAV), comprising:
an input adapted to receive flight control parameters from a companion processor, the flight control parameters are based on data from a plurality of sensors communicatively coupled to the companion processor and mounted on the UAV;
a modulator adapted to modulate the flight control parameters to create an emulated signal emulating a signal generated by a remote control configured to wirelessly control the UAV, the emulated signal encoding instructions to maneuver the UAV; and
a switch adapted to switch between a remote control signal received from a remote control unit and the emulated signal during a flight time of the UAV;
wherein the switch is adapted to switch between the remote control signal and the emulated signal based on at least one of a set of rules and a classifier for controlling which of the remote control signals and the emulated signals are provided to the primary flight control processor.

* * * * *